Aug. 17, 1926. 1,596,511
E. PISTOLESI
CONTROL DEVICE FOR VARIABLE PITCH PROPELLER SCREWS
Filed April 8, 1925  2 Sheets-Sheet 1

Enrico Pistolesi
INVENTOR his ATTY.

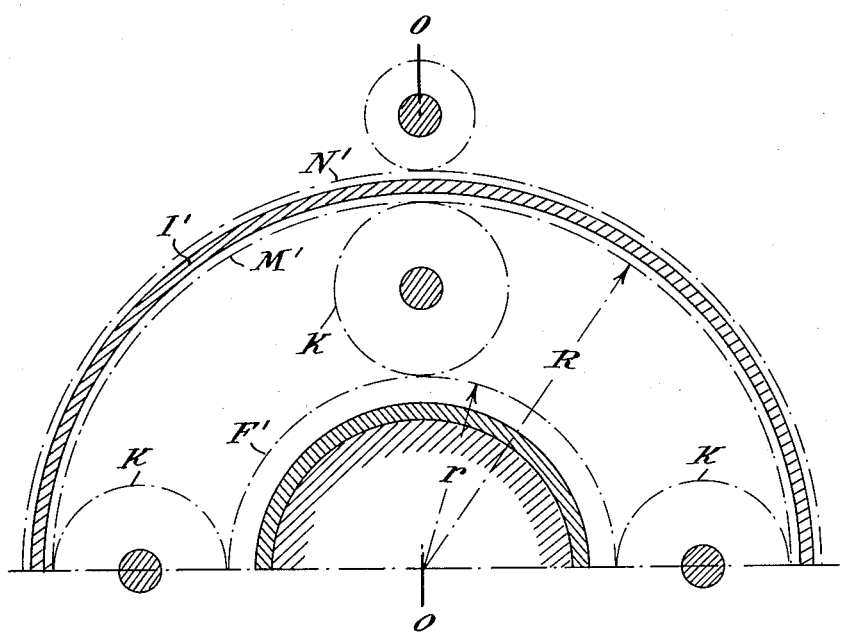
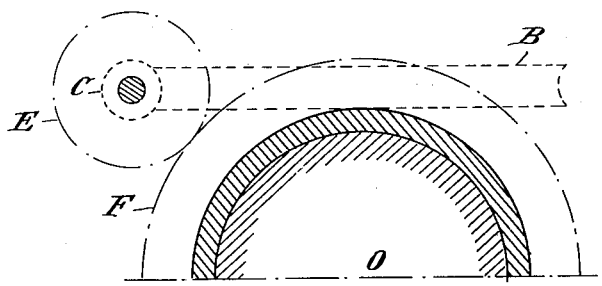

Patented Aug. 17, 1926.

1,596,511

UNITED STATES PATENT OFFICE.

ENRICO PISTOLESI, OF PISA, ITALY.

CONTROL DEVICE FOR VARIABLE-PITCH PROPELLER SCREWS.

Application filed April 8, 1925, Serial No. 21,573, and in Italy April 29, 1924.

Propellers with variable pitch that is propellers in which the blades are rotatably mounted around a longitudinal axis and may be displaced for the purpose of varying the pitch, are well known, but a great difference lies in the way how to effect said displacement of the blades from the outside without interfering with the rotation of the whole propeller strongly keyed on the driving shaft.

The present invention relates to a control device for regulating at will from the outside the displacement of the blades, founded on the principle of the epicyclic gears and endless screw.

The invention is illustrated in the accompanying drawings in which—

Fig. 2 shows a section on the line m—m.

Figure 1:
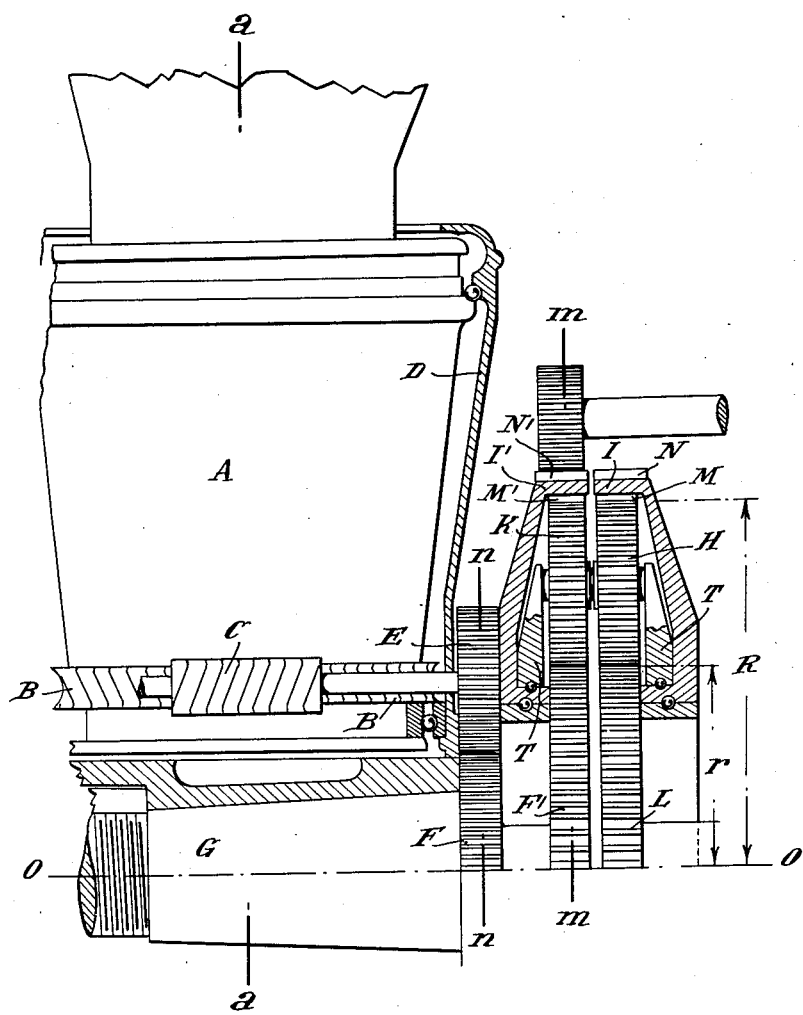
Fig. 1 shows a sectional elevation view.

While Fig. 3 is a section on the line n—n.

With reference to the accompanying drawings —A— is the root of a rotatable blade around the axis —aa— to which a toothed wheel —B— is fixed engaging an endless screw —C— the axis of which is parallel to the axis —oo— of the driving shaft —G—. The endless screw is rotatable in a proper seat provided in the external sleeve —D— of which the boss within which the blade —A— is rotatable, the sleeve being on the contrary strongly fixed to the driving shaft and transmitting the rotation of the shaft to the whole propeller.

On the outside of the sleeve —D— the axis of the endless screw is provided with a toothed pinion —E— fixed thereon so that when the pinion is rotating around its own axis, the blade will also rotate around its longitudinal axis, with the result of the displacement of the blade owing to the varying pitch of the screw.

On the shaft —G— there is a loose toothed wheel —F— connected with a second toothed wheel —F¹—, while a toothed wheel —L— is rigidly keyed to the same shaft —G— having the same pitch circle as the wheel —F¹—.

Externally to the wheels F¹ and L there are located two loose internally toothed crowns I and I¹. Both internal gears M and M¹ have the same pitch circle; moreover the gears M and L belong to the same order, M¹ and F also belonging to the same order.

Between L and M there is inserted a series H of pinions and another like series K is inserted between F¹ and M¹, the pitch circles of pinions H and K consequently being identical. The two series of intermediate pinions are mounted on the same support which is also loose. If the two crowns I and I¹ are stopped the wheels F F¹ and L have the same angular velocity as the driving shaft G, and consequently the pinion H is not rotated around its own axis, the screw pitch thus remaining invariable.

A change of the pitch may be obtained by displacing the one or the other of the two crowns or both as follows.

If by keeping stationary the crown I¹ the crown I is rotated through an angle $\alpha$, the wheels F, F¹ forming one body are angularly displaced through with respect to the shaft G, this displacement being measured by $$B = \alpha \frac{R}{r}$$

where R is the radius of the pitch circle of M, and $r$ the radius of the pitch circle of L and F¹. This rotation is effected in the same direction of the rotation impressed to the crown I and causes the rotation of E around its own axis—consequently a variation taking place in the pitch of the screw. This variation may be exactly calculated in function of the displacement which allows to operate the same variation exactly in the proportion wanted.

A rotation of $a$ in the crown I¹ by keeping the crown I stationary produces a rotation B of the same entity as in the preceding case of the wheels F F¹ but in a contrary direction.

From the preceding remarks it may be deduced that the screw pitch may be controlled in two ways, as follows:

a. By keeping the crown I or I¹ in place and rotating the other (I¹ or I) in one direction so as to increase the pitch, and in the opposite direction so as to diminish it.

b. By rendering both crowns I and I¹ movable and rotating either the one or the other to obtain an increase or diminution of the pitch.

According to case $a$ the angular displacement impressed to the crown indicates the proportion of the variation which has taken place in the pitch; in the case $b$ the measure will be furnished by the angle $\alpha$ of the two crowns.

In both cases the control of the pitch will be rigorous and permanent.

It is then clear that angle $\alpha$ being liable to be increased at will, it is possible to rotate the blades around their longitudinal axis for a complete revolution and even for as many revolutions as are wanted.

The displacement of the crown or crowns may be effected by hand or motor, so that the operation is executed with the rapidity judged necessary.

To effect said displacement it is convenient that the two crowns should be provided with external gears N and $N^1$ engaging a pinion the shaft of which will be moved by the hand of the pilot or by a motor. When employing a motor both movable crowns are particularly preferred, the rotation in this case taking place in one direction only so that it is a question of impressing said rotation to the one or the other of the crowns, which is easily obtained by inserting convenient clutch couplings or the like.

The advantages of the device as above specified are the following:

*a.* Control for the blades' displacement by means of an helical wheel and endless screw insuring a smooth control without stresses, with a convenient inclination of the thread, the thread being absolutely irreversible.

*b.* Possibility of rotating the blades around their own longitudinal axis of any angle whatever even larger than one revolution in both directions.

*c.* Possibility of effecting the control from the outside without any action of shock or ripping and of graduating the extension and rapidity of the operation within the amplest limits and with the most absolute precision.

*d.* Continuous, rigorous control of the displacement of the blades, consequently the screw pitch.

*e.* Absence of external rotatable parts.

*f.* Possibility of effecting the control of the pitch by hand or motor, in the case of using a motor, a rotatable member being used the direction of rotation of which is not necessary to reverse for inverting the direction of the screw pitch.

Having now particularly described and ascertained my said invention and the manner in which the same is to be performed, what I claim and desire to secure by Letters Patent is:

Means for varying the pitch of screw propellers, comprising in combination with a propeller hub, of a set of blades, each thereof having a root portion adapted to rotate about its longitudinal axis, a worm drive for said root having a pinion for operating the drive, and means operating to effect the said pinion, comprising a wheel loosely mounted on the hub and having double gears of different pitch circles, one of said gears being in mesh with said pinion, a pair of crown gears mounted to rotate about said hub, a pair of intermediate pinions in mesh respectively with the internal teeth of the crown gears, one of said last named pinions being in mesh with the other of said double gears, a gear corresponding to the last named gear of the double gears fixed on the hub and in mesh with the other of said internal pinions, and means movable into engagement with the external teeth of either or both of said crown gears to rotate or hold stationary each thereof.

In testimony whereof I have hereunto signed my name.

Ing. ENRICO PISTOLESI.